UNITED STATES PATENT OFFICE.

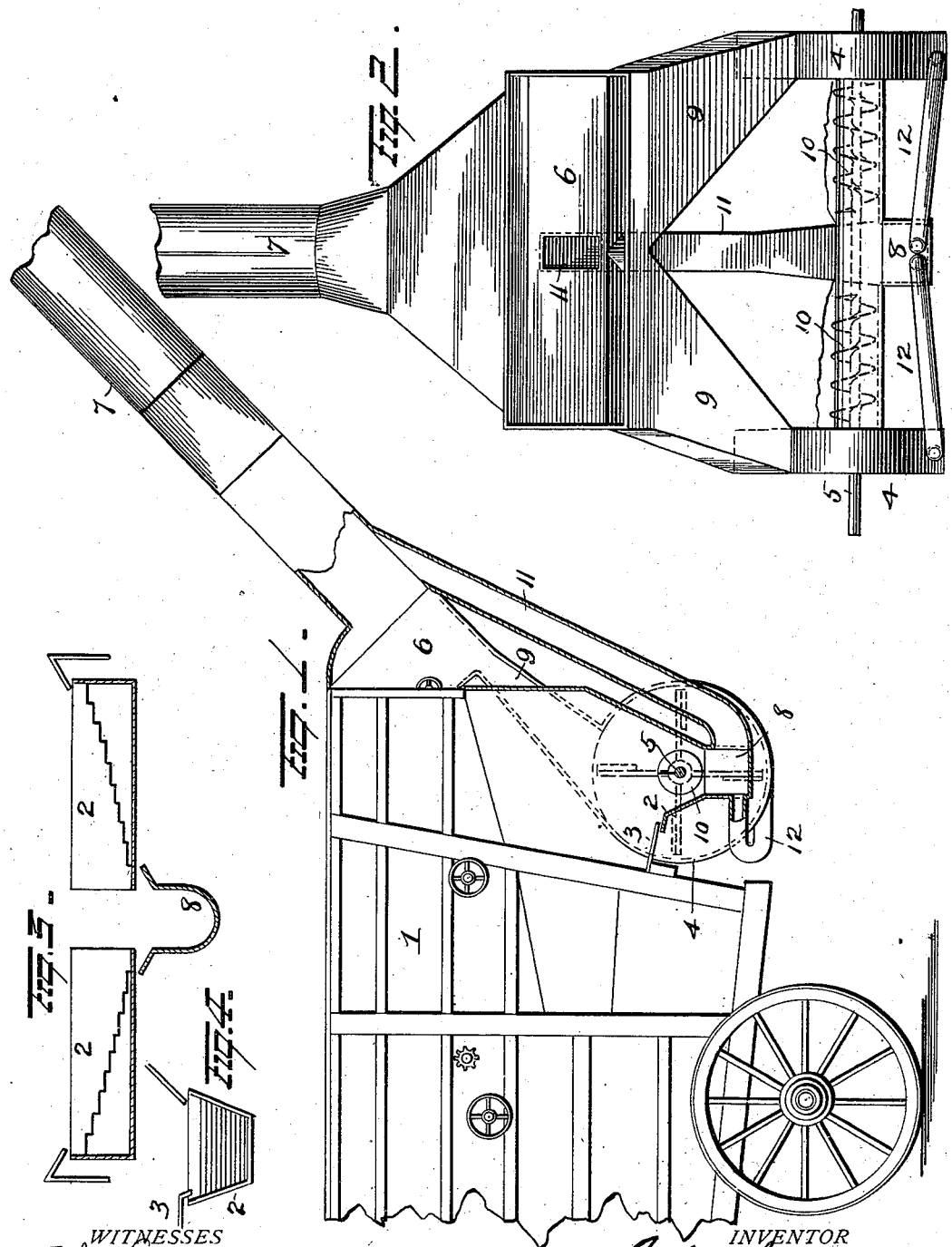

JOHN HENRY, OF GRAND FORKS, NORTH DAKOTA.

PNEUMATIC STACKER.

SPECIFICATION forming part of Letters Patent No. 723,870, dated March 31, 1903.

Application filed November 2, 1901. Serial No. 80,924. (No model.)

*To all whom it may concern:*

Be it known that I, JOHN HENRY, a resident of Grand Forks, in the county of Grand Forks and State of North Dakota, have invented certain new and useful Improvements in Pneumatic Stackers; and I do hereby declare the following to be a full, clear, and exact description of the invention, such as will enable others skilled in the art to which it appertains to make and use the same.

My invention relates to an improvement in pneumatic stackers, an object of the invention being to provide a device of this character which will permit of the separation of the chaff and straw or of their being stacked together, as may be desired.

With this object in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a view in section, and Figs. 3 and 4 are views illustrating a modified form of my invention.

1 represents the rear or discharge end of a threshing-machine to which my improvements are connected, as will now be described.

An elongated trough-shaped receptacle 2 is provided at the chaff-discharge outlet of the thresher, and the latter is made with an inclined platform 3 to direct the chaff into the trough-shaped receptacle. At each end of receptacle 2 a circular fan-casing 4 is provided and incloses a fan secured on a shaft 5 common to both fans and extending through the receptacle 2 and beyond the fan-casings, where it may be provided with a pulley or gear, (not shown,) to which motion is transmitted by any approved means. These fan-casings 4 discharge the greater portion of their blast into flues 9, communicating with the upper portions of the fan-casings and discharging into the opposite sides of the straw-receiver 6, which communicates with the straw-outlet of the thresher and is gradually contracted into a pipe 7 for directing the straw onto the stack.

The chaff-receptacle 2 is provided centrally with a pocket 8, to which the chaff is conveyed from both sides of the receptacle 2 by means of worm conveyers 10, secured on fan-shaft 5 and revolved simultaneously with the fans. The pocket 8 may be provided with a pipe (not shown) for conveying the chaff to a point separate from the straw-stack, if this separation of the straw and chaff is desired; but I have shown a pipe 11, connecting the pocket 8 and straw-receiver 6, to discharge the chaff therein and stack the straw and chaff together, and in order to eject the chaff from the pocket I provide two small pipes 12, communicating with the respective fan-casings and discharging through a common inlet into the pocket 8, said inlet preferably located opposite the entrance to pipe 11, so as to force the chaff therethrough.

Instead of providing worm conveyers in the receptacle 2 for conveying the chaff to a central pocket I might construct the receptacle as shown in Figs. 3 and 4. In this form of my invention the receptacle is made stepped or inclined to its center and is adapted to be reciprocated or shaken by any approved mechanism, (not shown,) hence moving the chaff to the center, where it falls into the pocket.

The operation of my improvements is as follows: The straw is discharged into receiver 6, where it is engaged by the air-blast, forced into the receiver at both sides by the fans, and conveyed to the stack or point of discharge by the pipe 7. The chaff falls into receptacle 2, is forced to the pocket 8 by either means above described or by any other desired mechanism, and is then forced into the straw-receiver, as above explained, or may be conveyed to a separate point of discharge, if preferred.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a pneumatic stacker, the combination of two independent receptacles, one for straw and the other for chaff, and a blower having two outlets for discharging air-blasts independently and simultaneously to the respective receptacles.

2. In a pneumatic stacker, the combination with a pipe or stack, of a straw-receptacle communicating with the pipe or stack, two blowers, both communicating with the straw-receptacle, a chaff-receptacle disposed between said fans and communicating with the pipe or stack, and pipes for directing independent air-blasts from the blowers through said chaff-receptacle.

3. In a pneumatic stacker, the combination with a chaff-receptacle, a pocket communicating therewith and means for conveying chaff from said receptacle to the pocket, of a blower communicating with the pocket, and an outlet-pipe also communicating with said pocket.

4. In a pneumatic stacker, the combination with a straw-receiver and a discharge-pipe connected thereto, of fans discharging blasts of air into the receiver to force the straw through the discharge-pipe, a trough-shaped receptacle for the chaff, a pocket at the center of said receptacle into which the chaff falls, a discharge-pipe for said pocket, an air-blast pipe into which the fans direct a portion of their blast, communicating with the pocket to eject the chaff through the chaff-discharge pipe.

In testimony whereof I have signed this specification in the presence of two subscribing witnesses.

JOHN HENRY.

Witnesses:
T. CARTER GRIFFITH,
MAUDE I. SMITH.